United States Patent
Xiao et al.

(10) Patent No.: US 10,001,089 B2
(45) Date of Patent: Jun. 19, 2018

(54) SLUDGE DETECTION AND COMPENSATION FOR THE CONTINUOUSLY VARIABLE COMPRESSOR RECIRCULATION VALVE

(71) Applicant: Ford Global Technologies, LLC, Dearborn, MI (US)

(72) Inventors: Baitao Xiao, Canton, MI (US); Hamid-Reza Ossareh, Ann Arbor, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 829 days.

(21) Appl. No.: 14/562,205

(22) Filed: Dec. 5, 2014

(65) Prior Publication Data
US 2016/0160806 A1    Jun. 9, 2016

(51) Int. Cl.
| | | |
|---|---|---|
| F02M 25/06 | (2016.01) | |
| F02M 26/04 | (2016.01) | |
| F02D 13/02 | (2006.01) | |
| F02D 23/02 | (2006.01) | |
| F02M 26/52 | (2016.01) | |
| F02D 21/08 | (2006.01) | |
| F02M 26/08 | (2016.01) | |

(52) U.S. Cl.
CPC ......... *F02M 26/04* (2016.02); *F02D 13/0203* (2013.01); *F02D 23/02* (2013.01); *F02M 26/52* (2016.02); *F02D 2021/083* (2013.01); *F02M 26/08* (2016.02); *Y02T 10/144* (2013.01); *Y02T 10/18* (2013.01)

(58) Field of Classification Search
CPC ........ F02M 26/04; F02M 26/52; F02M 26/08; F02D 23/02; F02D 13/0203; F02D 2021/083; Y02T 10/144; Y02T 10/18; F04D 27/02; F04D 27/0223
USPC ............................................. 123/564; 60/611
See application file for complete search history.

(56) References Cited

U.S. PATENT DOCUMENTS

| | | | |
|---|---|---|---|
| 6,990,814 B2 * | 1/2006 | Boley ..................... | F02B 37/16 60/602 |
| 7,677,227 B2 * | 3/2010 | Sagisaka ................. | F02B 37/18 123/559.1 |
| 8,095,299 B2 | 1/2012 | Martin et al. | |
| 8,375,714 B2 * | 2/2013 | Gokhale ................. | F02B 37/18 60/601 |
| 8,661,814 B2 | 3/2014 | Ulrey et al. | |
| 2014/0260241 A1 | 9/2014 | Jankovic et al. | |

* cited by examiner

*Primary Examiner* — Hung Q Nguyen
(74) *Attorney, Agent, or Firm* — Julia Voutyras; McCoy Russell LLP

(57) ABSTRACT

Methods and systems are provided for improving boost pressure control by adjusting a variable compressor recirculation valve. In one example, a method may include adjusting a position of a continuously variable compressor recirculation valve based on amount of sludge accumulation on the valve. The amount of sludge accumulation may be estimated based on a difference between total intake flow downstream of a compressor recirculation passage outlet but upstream of the passage, and total engine flow entering engine cylinders.

20 Claims, 4 Drawing Sheets

SLUDGE DETECTION AND COMPENSATION FOR THE CONTINUOUSLY VARIABLE COMPRESSOR RECIRCULATION VALVE

FIELD

The present description relates generally to methods and systems for improving boost pressure control by adjusting a variable compressor recirculation valve.

BACKGROUND/SUMMARY

Engine systems may be configured with boosting devices, such as turbochargers or superchargers, for providing a boosted aircharge delivered to the engine intake manifold and improving peak power outputs. The use of a compressor allows a smaller displacement engine to provide as much power as a larger displacement engine, but with additional fuel economy benefits. However, compressors may be prone to surge. Surge can lead to noise, vibration, and harshness (NVH) issues such as undesirable noise from the engine intake system. In extreme cases, surge may result in compressor damage. To address compressor surge, engine systems may include a continuously variable compressor recirculation valve (CCRV) coupled across the compressor to enable rapid decaying of boost pressure. The CCRV may recirculate compressed air from the compressor outlet to the compressor inlet. In an example, the CCRV may be configured similar to an intake throttle butterfly valve so that it can be actuated fully open, fully closed, or positions therebetween.

Throughout the life of an engine, deposits such as sludge may accumulate on the throttle valve body and reduce the effective airflow rate for a given throttle plate angle. As an example, the inventors have identified that not only can sludge accumulate, but that it can reduce airflow through across a range of throttle valve angles.

Other attempts to control CCRV for boost control include adjusting a wastegate and/or intake throttle other than CCRV in response to CCRV degradation. One example approach is shown by Jankovic et al. in US 2014/0260241 A1. Therein, CCRV degradation is determined based on response of the CCRV to a command of changing its position, where the CCRV response is measured via a position sensor.

However, the inventors herein have recognized that even adjusting other actuators may not sufficiently address the issue of sludge accumulation on the valve body. Further, even if the CCRV position is sensed, sludge can still adversely affect the flow control. For example, the valve can be accurately controlled to the desired position, yet due to sludge buildup the flow for the desired position is less than would otherwise be expected and thus overall flow control can degrade. Moreover, because sludge may gradually accumulate on the valve body, the CCRV may still be operable even though the response of CCRV to the command is not accurate.

In one example, the issues described above may be addressed by a method comprising: adjusting a position of a valve located inside a compressor recirculation passage of an engine based on a recirculation flow, the recirculation flow based on a difference between total intake flow downstream of a compressor recirculation passage outlet but upstream of the passage inlet, and total engine flow entering engine cylinders.

In this way, recirculation flow may be estimated, and compressor surge may be addressed by accurately controlling the recirculation flow through the CCRV. Moreover, sludge accumulation on the valve body may be estimated based on the estimated recirculation flow.

As one example, a total intake flow rate is measured by a mass air flow sensor positioned downstream of a compressor recirculation passage outlet but upstream of the passage inlet. A recirculation flow in the compressor recirculation passage may be estimated based on the difference between the measured total intake flow and a total engine flow entering engine cylinders. The total amount of sludge accumulation on a valve positioned in the compressor recirculation passage may be estimated based on the recirculation flow. The valve position may then be adjusted based on the estimated total amount of sludge accumulation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
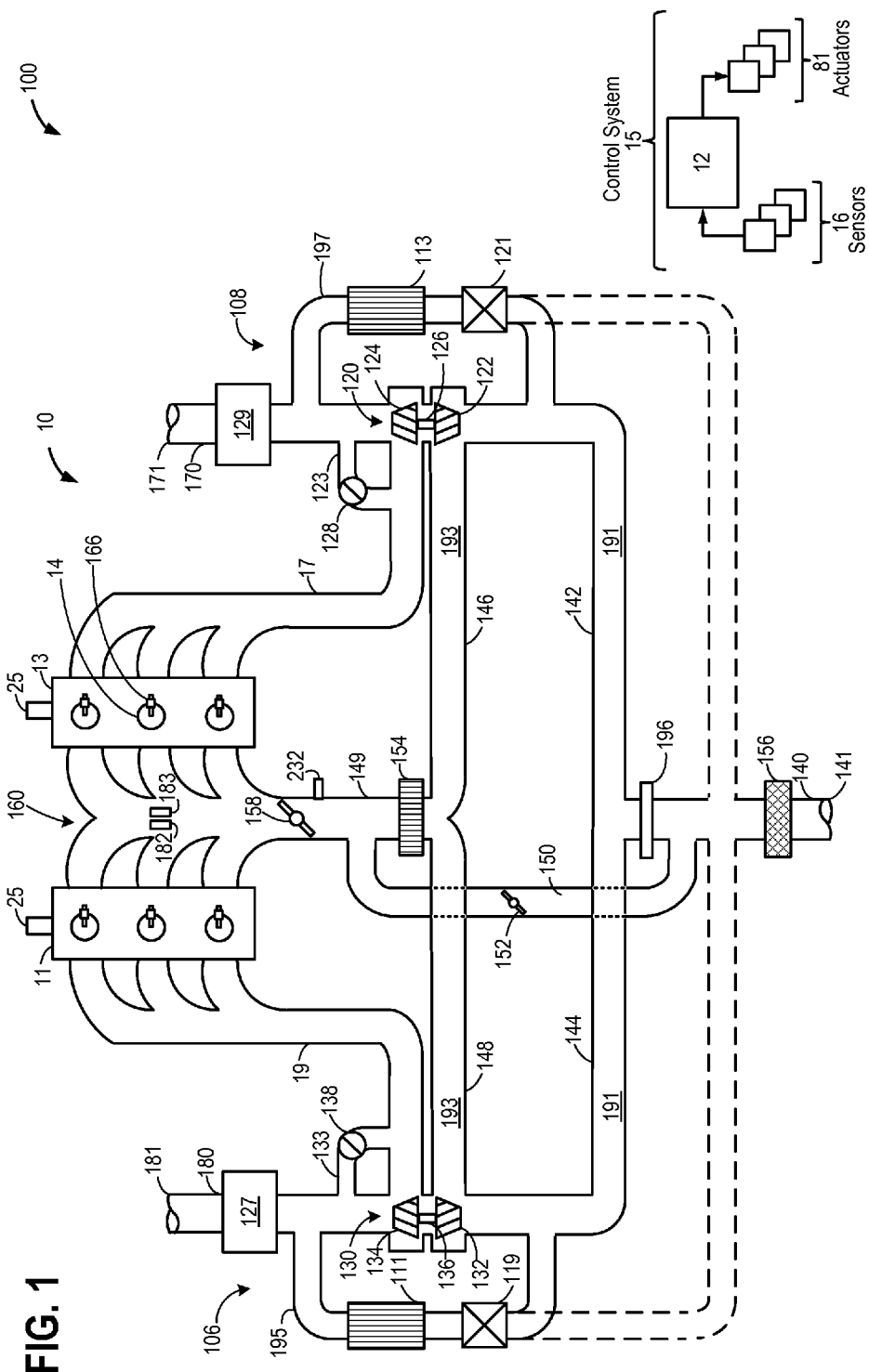
FIG. 1 shows a schematic depiction of an example boosted engine system.

The following description relates to systems and methods for improving boost pressure control in a boosted engine system, such as the system of FIG. 1. A CCRV valve positioned inside a compressor recirculation (CR) passage is used to adjust the boost pressure. Sludge may accumulate on the CCRV and adversely affect the valve performance. As an example, FIG. 2 demonstrates the effect of sludge accumulation on a throttle valve. FIG. 3 shows a high level flow chart of an example method for compressor surge control by controlling the CCRV. The CCRV position may be further adjusted based on the amount of sludge accumulation on the valve body in FIG. 4.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air entering the ambient air inlet 141 via intake passage 140, wherein the intake air may be at ambient pressure. Exhaust gas may exit engine system 100 to ambient through tailpipe exits 171 and 181 located at the very end of exhaust passages 170 and 180. The airflow through engine system 100 starts from ambient air inlet 141, travels through the engine system, and ends at tailpipe exits 171 or 181. As such, upstream of any components within engine system 100 does not include anything past ambient air inlet 141. Downstream of any components within the engine system 100 does not include anything past tailpipe exits 171 and 181. Intake passage 140 can include an air filter 156. Engine system 100 may be a split-engine system wherein intake passage 140 is branched downstream of air filter 156 into first and second parallel intake passages, each including a turbocharger compressor. In the resulting configuration, at least a portion of the intake air is directed to compressor 122 of turbocharger 120 via a first parallel intake passage 142 and at least another portion of the intake air is directed to compressor 132 of turbocharger 130 via a second parallel intake passage 144 of the intake passage 140.

The first portion of the total intake air that is compressed by compressor 122 may be supplied to intake manifold 160 via first parallel branched intake passage 146. In this way, intake passages 142 and 146 form a first parallel branch of the engine's air intake system. Similarly, a second portion of the total intake air can be compressed via compressor 132 where it may be supplied to intake manifold 160 via second parallel branched intake passage 148. Thus, intake passages 144 and 148 form a second parallel branch of the engine's air intake system. As shown in FIG. 1, intake air from intake passages 146 and 148 can be recombined via a common intake passage 149 before reaching intake manifold 160, where the intake air may be provided to the engine.

In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 may include an air cooler 154 and an air intake throttle 158. The position of intake throttle 158 can be adjusted by the control system via a throttle actuator (not shown) communicatively coupled to controller 12.

A compressor recirculation (CR) passage 150 may be provided for compressor surge control. Specifically, to reduce compressor surge by flowing boosted air from upstream of an intake throttle inlet to upstream of the compressor inlets, boost pressure may be rapidly reduced, expediting boost control. Flow through CR passage 150 may be regulated by adjusting the position of compressor surge valve 152 positioned therein. In an example, compressor recirculation valve 152 may be configured similar to an intake throttle butterfly valve so that it can be actuated fully open, fully closed, or positions there-between. Thus recirculation valve 152 may also be referred to herein as a continuously variable compressor recirculation valve, or CCRV. In another example, the CCRV may be configured differently (e.g., as a poppet valve). It will be appreciated that while the CCRV is shown configured for a V-6 twin turbocharged engine in FIG. 1, the CCRV may be similarly applied in other engine configurations, such as applied to I-3, I-4, V-8, and other engine configurations with one or multiple turbochargers. In an example configuration, the CR passage may be located such that airflow travels from upstream of air cooler 154 to a location upstream of the intake passages 142 and 144.

A mass air flow sensor 196 may be positioned within intake passage 140 downstream of the CR passage outlet and upstream of the first and second parallel intake passage 142 and 144. The mass air flow sensor 196 may measure total intake flow downstream of the CR passage outlet. As an example, the inlet air enters intake passage 140 through ambient air inlet 141, and may join the recirculation flow from CR passage immediately upstream of the mass air flow sensor 196. Immediately after mass air flow sensor 196, the combined flow splits into the first and second parallel intake passages (142 and 144). The split flow in each passage is compressed by compressor 122 or 132, and rejoined together downstream of the inlet of the CR passage 150 in the common intake passage 149. Part of the rejoined flow may be directed away from the common intake passage 149 through CR passage 150 before entering engine cylinders through intake throttle 158.

Engine 10 may include a plurality of cylinders 14. In the depicted example, engine 10 includes six cylinders arranged in a V-configuration. Specifically, the six cylinders are arranged on two banks 13 and 11, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific parallel exhaust passages. In the depicted example, a first bank 13 of cylinders of engine 10 can exhaust products of combustion via a first parallel exhaust passage 17 and a second bank 11 of cylinders can exhaust products of combustion via a second parallel exhaust passage 19. Each of the first and second parallel exhaust passages 17 and 19 may further include a turbocharger turbine. Specifically, products of combustion that are exhausted via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. Similarly, products of combustion that are exhausted via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gas flowing through exhaust passage 19 can bypass turbine 134 via turbine bypass passage 133 as controlled by wastegate 138. The wastegate actuators may regulate boost pressure by controlling exhaust flow over the corresponding turbines. However, in contrast to the actuation of the compressor recirculation valves, the impact of wastegate actuation on boost pressure is substantially slower due to slower turbocharger dynamics.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Exhaust gases in first parallel exhaust passage 17 may be directed to the atmosphere via branched parallel exhaust passage 170 while exhaust gases in second parallel exhaust passage 19 may be directed to the atmosphere via branched parallel exhaust passage 180. Exhaust passages 170 and 180 may include one or more exhaust after-treatment devices (129 and 127), such as a catalyst, and one or more exhaust gas sensors.

In some embodiments, engine 10 may further include one or more exhaust gas recirculation (EGR) passages for recirculating at least a portion of exhaust gas from first and second parallel exhaust passages 17 and 19 and/or first and second parallel branched exhaust passages 170 and 180, to locations upstream of air intake throttle 158. These may include high-pressure EGR loops for providing high-pressure EGR (HP-EGR) and low-pressure EGR-loops for providing low-pressure EGR (LP-EGR). When included, HP-EGR may be provided in the absence of boost provided by turbochargers 120, 130, while LP-EGR may be provided in the presence of turbocharger boost and/or when exhaust gas temperature is above a threshold. In still other examples, both HP-EGR and LP-EGR may be provided simultaneously. The HP-EGR loops (not shown) may recirculate at least some exhaust gas from each of the branched parallel exhaust passages 170 and 180, downstream of the exhaust turbine 124 and 134, to parallel branched intake passages 146 and 148 or intake manifold 160. EGR flow through the HP-EGR loops may be controlled via respective HP-EGR valves and HP-EGR charge air coolers. In one embodiment, the LP-EGR loops 197 and 195 may recirculate at least some exhaust gas from each of the branched parallel exhaust passages 170 and 180, downstream of the exhaust turbine 124 and 134, to first and second parallel intake passages 142 and 144, upstream of the compressor and downstream of CR passage outlet, as depicted with solid lines in FIG. 1. In another embodiment, the LP-EGR loops 197 and 195 may recirculate at least some exhaust gas to the intake passage 140 at a location upstream of the CR passage outlet, as depicted with dashed lines in FIG. 1. Each of the LP-EGR loops 197 and 195 may have corresponding LP-EGR valves 121 and 119, for controlling exhaust flow through the LP-EGR loop, as well as respective charge air coolers 113 and 111 for lowering a temperature of exhaust gas recirculated to the engine intake.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 100 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include a humidity sensor, MAP sensor 182, and MCT sensor 183. In some examples, common intake passage 149 may include a throttle inlet pressure (TIP) sensor 232 for estimating a throttle inlet pressure, also referred to as the boost pressure, and/or a throttle inlet temperature sensor for estimating a throttle air temperature (TCT). In other examples, one or more of the EGR passages may include pressure, temperature, and air-to-fuel ratio sensors, for determining EGR flow characteristics. As another example, actuators 81 may include fuel injector 166, HP-EGR valves (not shown), LP-EGR valves 121 and 119, throttle valve 158, CCRV 152, and wastegates 128, 138. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Controller 12 may also include an electronic storage medium for storing calibration values and the routines.

Figure 2:
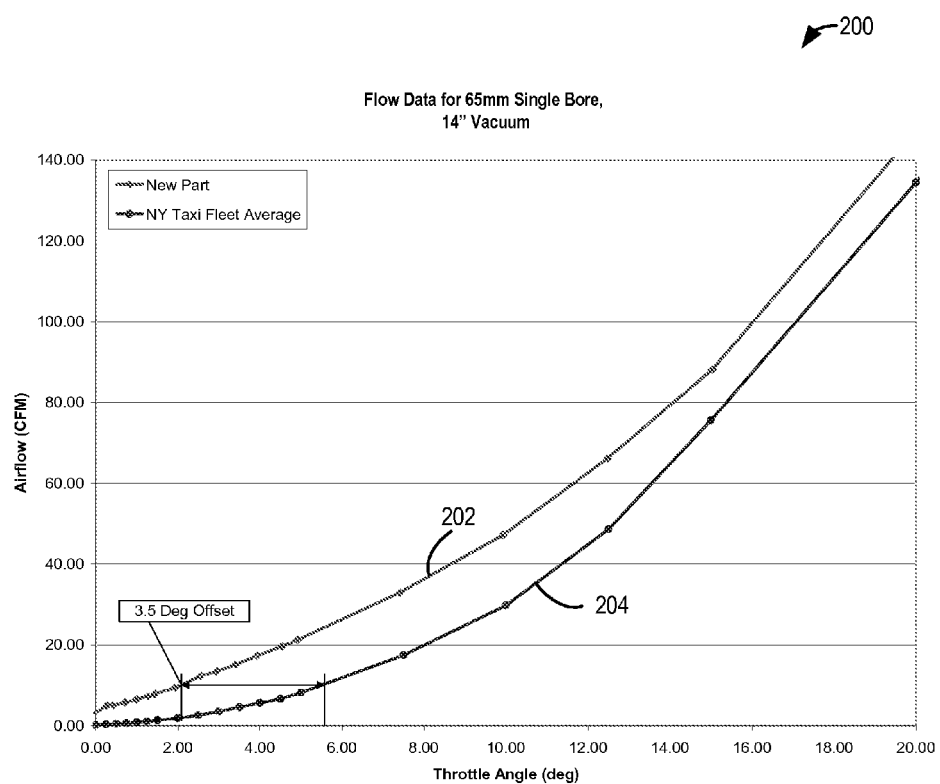
FIG. 2 demonstrates effects of sludge accumulation on a throttle valve.
Figure 3:
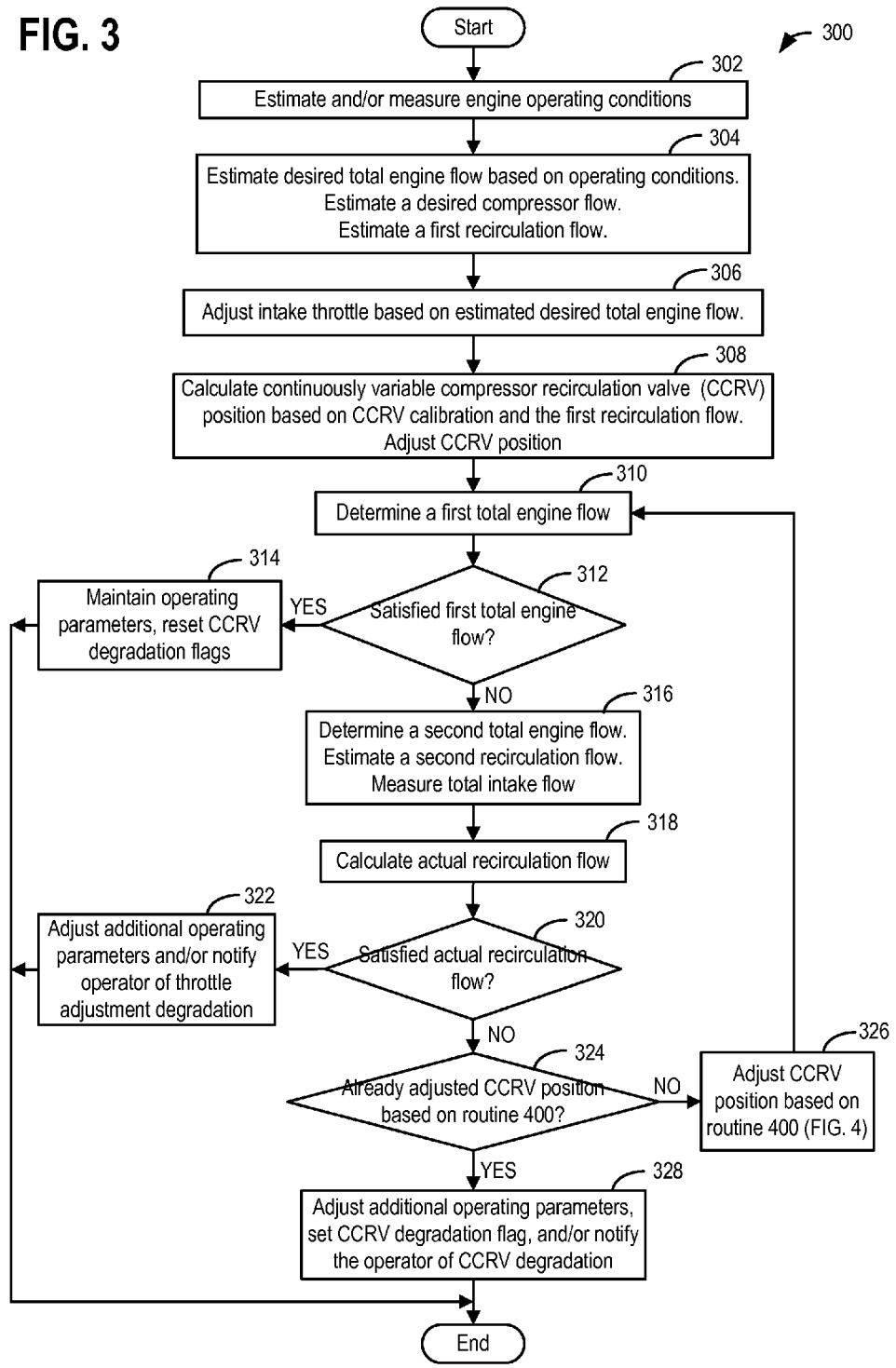
FIG. 3 shows a high level flow chart of an example method for compressor surge control.

Now turning to FIG. 2, FIG. 2 demonstrates that sludge accumulation on a throttle valve body may reduce the effective airflow through the valve. Throttle opening angle and corresponding airflow rate through a new valve and an old valve are shown in 202 and 204 respectively. Airflow through both valves increases with the increased throttle opening. However, as the valve ages, effective flow through the old valve decreases when the throttle opening angle is the same as the new valve. The decreased effective flow may be caused by sludge accumulation on the valve body. To achieve the same effective flow, older valve may need to increase the opening angle. Further, an amount of sludge accumulation on the body of the old part may be estimated based on the amount of decreased effective flow.

Figure 4:
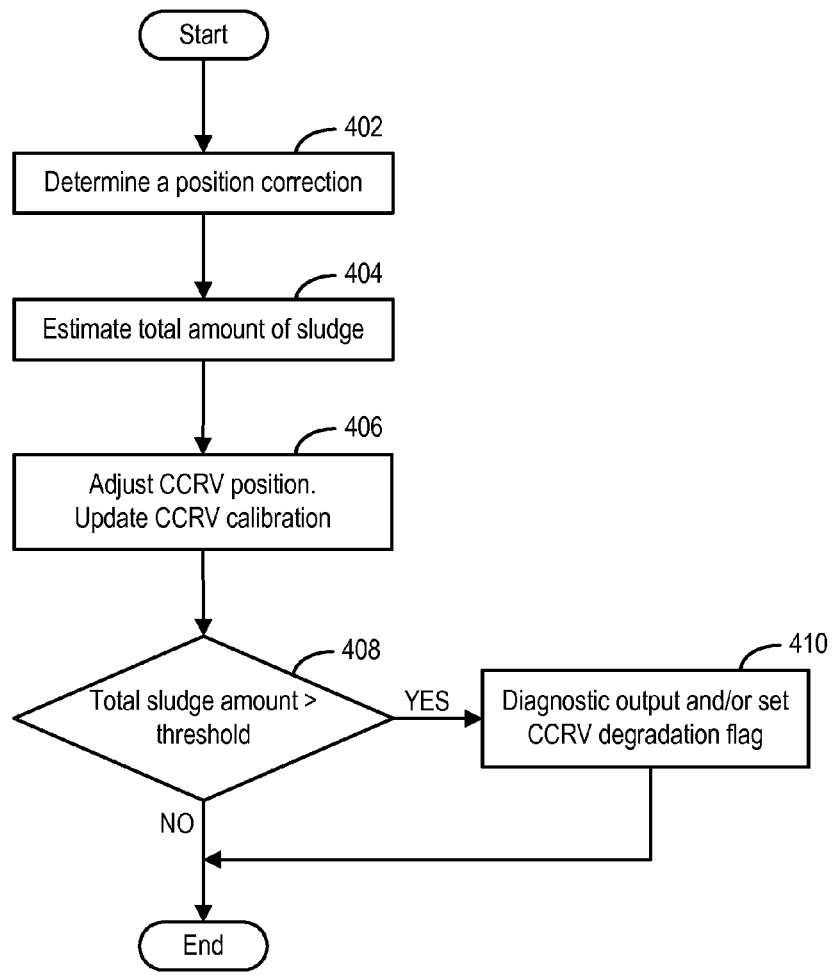
FIG. 4 shows a low level flow chart of an example method for adjusting CCRV position based on an amount of sludge accumulation on the valve.

Example control routines for compressor surge control and sludge compensation are described in FIGS. 3-4. Controller 12 may determine a target recirculation flow based on vehicle and/or engine operating conditions. A corresponding CCRV opening angle may then be calculated based on a calibration method and the target recirculation flow. Due to accumulation of the sludge over CCRV body, the target recirculation flow may not be achieved with the calculated CCRV opening angle. Under such condition, the CCRV opening angle may be corrected by a position correction to increase the effective flow. The calibration method may also be updated based on an amount of sludge accumulation.

Now turning to FIG. 3, routine 300 demonstrates an example method to address compressor surge. The routine includes adjusting CCRV position based on a desired total engine flow rate entering engine cylinders and a corresponding desired compressor flow rate. If actual total engine flow rate does not satisfy requirement after CCRV adjustment, the routine further corrects CCRV position to account for accumulated sludge on the valve body. It will be appreciated that the estimating of the desired total engine flow rate entering engine cylinders and the desired compressor flow rate may be performed during all engine operating conditions including during steady-state and transient conditions. By continually estimating the engine flow rate entering engine cylinders and adjusting the CCRV in accordance to maintain the compressor flow rate at or above the desired compressor flow rate, the compressor state may be maintained outside of (specifically, to the right of) a hard surge and a soft surge limit.

At 302, routine 300 includes estimating and/or measuring engine operating conditions. The estimated conditions may include, for example, engine speed (Ne), torque demand, boost pressure, MAP, engine temperature, combustion air-fuel ratio (AFR), exhaust catalyst temperature, ambient conditions (e.g. BP), etc.

At 304, the routine estimates a desired total engine flow entering engine cylinders (or engine intake throttle mass flow rate) based on operating conditions. In addition, a desired compressor flow to avoid surge may be estimated based on the desired total engine flow and a compressor surge limit. As such, the desired compressor flow may be a surge constrained compressor flow that is based on a hard surge limit of the compressor. Based on the desired total engine flow and the desired compressor flow, a first recirculation flow may be estimated. The first recirculation flow is a desired recirculation flow to achieve the desired total engine flow. In an example, the first recirculation flow rate may be estimated based a difference between the desired compressor flow rate and the desired total engine flow rate. In another example, the first recirculation flow rate may be estimated based on the desired compressor flow rate, the desired engine flow rate, and EGR flow rate.

At 306, opening of air intake throttle 158 may be adjusted based on the estimated desired total engine flow rate.

At 308, routine 300 includes calculating a CCRV position based on a CCRV calibration and the first recirculation flow determined at 304, and adjusting CCRV to the calculated position. As an example, the CCRV calibration may be a lookup table or an equation stored in controller 12, wherein the controller can calculate a degree of CCRV opening based on a given flow rate. As another example, the lookup table or the equation stored in controller 12 may be generated based on the orifice equation. As yet another example, the lookup table or the equation stored in controller 12 may be modified based on an amount of sludge accumulation on the valve body.

At 310, a first total engine flow entering engine cylinders may be determined. The first total engine flow may be the actual total engine flow entering engine cylinders after adjusting CCRV based on CCRV calibration at 308. In an example, the first total engine flow may be determined based on manifold pressure and engine speed (speed density). In another example, the first total engine flow may be determined based on throttle inlet pressure and engine speed (speed density). In yet another example, a mass airflow sensor, optionally in combination with other sensor data, may determine the first total engine flow.

At 312, the first total engine flow entering engine cylinders may be compared to the desired total engine flow estimated at 304 to determine if further CCRV adjustment is necessary. If the first total engine flow rate is within a satisfactory range around the desired total engine flow, routine 300 moves to 314, wherein current operating parameters are maintained. Current operating parameters may include current CCRV calibration and calibrations for other valves such as the intake throttle and EGR valves. In addition, at 314, any CCRV degradation flags are cleared and the operator will not be notified. If the first total engine flow is out of a satisfactory range around the desired total engine flow, routine 300 moves to 316 and CCRV position is further adjusted based on diagnosis of CCRV performance.

At 316, routine 300 determines a second total engine flow entering engine cylinders and estimates a second recirculation flow, when there is no inlet or outlet flow between downstream of the CR passage outlet and upstream of the CR passage inlet. The second recirculation flow may be a desired recirculation flow estimated under the assumption that the current CCRV calibration is accurate. In addition, a total intake flow downstream of the CR passage outlet but upstream of the CR passage inlet may be measured by a mass air flow sensor. Note that when there are no inlet or outlet flows between downstream of the CR passage outlet and upstream of the CR passage inlet, the total intake flow may be the same as the compressor flow.

In an example, if EGR flows are already stopped at 310 or if engine system 100 does not include EGR system, then the second total engine flow may be the same as the first total engine flow, and the second recirculation flow may be the same as the first recirculation flow.

In another example, if EGR flows are not stopped at 310, then controller 12 may stop the EGR flow (e.g., reduce one or more of high pressure EGR flow and low pressure EGR flow to zero) first when entering 316, if there is inlet or outlet flow between downstream of the CR passage outlet and upstream of the CR passage inlet. In one embodiment, if the LP-EGR recirculates at least some exhaust gas to first and second parallel intake passages 142 and 144, upstream of the compressor and downstream of CR passage outlet, controller 12 may stop LP-EGR. In another embodiment, if the LP-EGR recirculates at least some exhaust gas to intake passage 140 at a location upstream of the CR passage outlet, the LP-EGR flow may not need to be stopped. In yet another embodiment, if the HP-EGR recirculates at least some exhaust gas to parallel branched intake passages 146 and 148, controller may stop HP-EGR. In yet another embodiment, if the HP-EGR recirculates at least some exhaust gas to intake manifold 160 downstream of the CR passage inlet, the HP-EGR may not need to be stopped. In this example, the second total engine flow entering engine cylinders may be determined in the same way as explained at 310. The second recirculation flow may be estimated based on the second total engine flow entering engine cylinders, the EGR flow and CCRV calibration. After determining the second recirculation flow and the total intake flow, controller 12 may restore all EGR flows at the end of 316.

At 318, actual recirculation flow may be calculated based on a difference between the second total engine flow entering engine cylinders and the total intake flow.

At 320, the actual recirculation flow may be compared to the second recirculation flow determined at 316. If the actual recirculation is out of a satisfactory range about the second recirculation flow, routine 300 moves to 324. If the actual recirculation flow is within a satisfactory range around the second recirculation flow, the CCRV may operate properly and the unsatisfactory first total engine flow at 312 may due to factors unrelated to CCRV. For example, sludge may accumulate on air intake throttle 158 and cause errors in adjusting the throttle flow. Then, at 322, additional operating parameters are adjusted and/or the operator is notified of throttle adjustment degradation, for example via a display in the vehicle. Additionally, a diagnostic code can be set that is read via a diagnostic port or otherwise communicated by the control system, for example, to a technician via a diagnostic tool. Returning to 322, in one example, the air intake throttle 158 may be re-calibrated by the controller to address sludge accumulation. In another example, the HP-EGR valve and the wastegate may be adjusted by the controller to achieve the desired total engine flow and boost pressure.

At 324, routine 300 determines if the CCRV position has been adjusted based on routine 400. If the answer is YES, at 328, a CCRV degradation flag may be set and/or the operator is notified of the CCRV degradation. In addition, additional operating parameters may be adjusted. For example, the HP-EGR valve and the wastegate may be adjusted to achieve the desired total engine flow and boost pressure. If the CCRV position has not been adjusted based on routine 400 (FIG. 4), then at 326, CCRV position is adjusted based on an amount of sludge accumulation on the valve. Next, routine 300 moves back to 310 to estimate the total engine flow entering engine cylinders again.

Now turning to FIG. 4, routine 400 is a low level routine for adjusting CCRV position based on an amount of sludge accumulation on the valve. In addition, CCRV calibration may be updated based on the amount of sludge accumulation.

At 402, routine 400 determines a position correction of the CCRV opening based on the difference between the actual recirculation flow and the second recirculation flow to account for accumulated sludge on the valve. As an example, the position correction may be determined based on the difference and a current CCRV calibration. As another example, the position correction may be a closed loop correction generated by inputting the difference to a feedback controller. The feedback controller may be a P, PI, or PID controller. As yet another example, the position correction may be a small increment of CCRV opening generated by a feed forward controller.

At 404, a total amount of sludge accumulation on the CCRV is estimated. As an example, the total amount of sludge may be estimated based on a difference between current CCRV opening and an ideal opening. The ideal CCRV opening may be calculated based on the actual recirculation flow and the orifice equation assuming no sludge accumulation on the valve body. As another example, the total amount of sludge may be estimated based on the difference between the actual recirculation flow and a desired recirculation flow without sludge accumulation on the CCRV. The desired recirculation flow without sludge accumulation may be calculated based on current CCRV opening and the orifice equation. As yet another example, the total amount of sludge accumulation may be estimated based on a summation of previous CCRV position corrections.

At 406, the CCRV is adjusted to a new position. In an example, the CCRV position may be adjusted based on the position correction determined at 402. In another example, the CCRV position may be adjusted based on the total amount of determined sludge accumulation on the valve. In addition, at 406, the CCRV calibration table may be updated by applying an offset to the original calibration. For example, the offset may be determined based on the position correction of CCRV opening. Further, the example may include a calibration table filled with data at a plurality of points as a function of one or more input variables, where the output of the table based on the input variable is offset by the learned sludge accumulation correction. The updated CCRV calibration may then be stored in the memory of controller 12.

At 408, routine 400 compares the total amount of sludge accumulation on the CCRV to a threshold. If the total amount of sludge accumulation is lower than the threshold, controller 12 exits routine 400. If the total amount of sludge accumulation is greater than the threshold, routine 400 moves to 410. At 410, a diagnostic signal may be generated indicating the amount of sludge accumulation. In addition, the CCRV degradation flag may be set.

In this way, compressor recirculation flow may be monitored with a mass air flow sensor positioned downstream of a compressor recirculation passage outlet but upstream of the passage inlet. The recirculation flow may be accurately controlled by adjusting the CCRV position based on sludge accumulation on the valve to achieve the technical effect of more accurate engine boost control and reduced surge. The mass air flow sensor may also be used to monitor the total intake flow to the engine system 100 when the compressor recirculation passage is not in use.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
adjusting a position of a valve located inside a compressor recirculation passage of an engine based on a recirculation flow through the valve, the recirculation flow determined based on a difference between a total intake flow and a total engine flow entering engine cylinders, the total intake flow measured downstream of a compressor recirculation passage outlet and upstream of a compressor recirculation passage inlet.

2. The method of claim 1, further comprising determining a position correction based on the determined recirculation flow, and adjusting the position of the valve based on the position correction.

3. The method of claim 2, further comprising determining the position correction via a feedback controller.

4. The method of claim 2, further comprising determining the position correction based on the determined recirculation flow and an ideal recirculation flow.

5. The method of claim 1, wherein the total intake flow is measured with a mass airflow sensor positioned downstream of the compressor recirculation passage outlet and upstream of the compressor recirculation passage inlet.

6. The method of claim 1, wherein the total engine flow entering the engine cylinders is determined based on a manifold pressure and an engine speed (speed density).

7. The method of claim 1, wherein the recirculation flow is determined when an exhaust gas recirculation flow is stopped (zero).

8. The method of claim 1, wherein the recirculation flow is determined when a low-pressure exhaust gas recirculation flow is stopped (zero).

9. The method of claim 1, wherein the recirculation flow is determined when a high-pressure exhaust gas recirculation flow is stopped (zero).

10. The method of claim 1, further comprising adjusting the position of the valve based on the determined recirculation flow and a desired recirculation flow.

11. An engine method, comprising:
measuring a total intake flow with a mass air flow sensor positioned downstream of a compressor recirculation passage outlet and upstream of a compressor recirculation passage inlet;
estimating a recirculation flow through the compressor recirculation passage based on a difference between the measured total intake flow and a total engine flow entering engine cylinders;
determining a total amount of sludge accumulation on a valve positioned inside the compressor recirculation passage based on the estimated recirculation flow; and
adjusting a position of the valve based on the determined total amount of sludge accumulation on the valve.

12. The method of claim 11, further comprising determining a position correction based on the total amount of sludge accumulation on the valve, the position correction being an increment of valve opening, and adjusting the position of the valve based on the position correction.

13. The method of claim 11, further comprising determining the total amount of sludge accumulation based on a difference between the estimated recirculation flow and a desired recirculation flow.

14. The method of claim 11, wherein the recirculation flow is estimated when an exhaust gas recirculation flow is stopped (zero).

15. The method of claim 11, further comprising calculating the position of the valve based on a calibration table, and updating the calibration table based on the total amount of sludge accumulation.

16. The method of claim 15, further comprising adjusting an HP-EGR valve and a wastegate to achieve a desired total engine flow and a desired boost pressure.

17. The method of claim 11, further comprising generating a diagnostic signal indicative of the total amount of determined sludge accumulation on the valve.

18. A system in a vehicle, comprising:
an engine including an intake manifold;
a compressor for compressing aircharge delivered to the intake manifold;
a compressor recirculation passage comprising an inlet coupled to a first location downstream of an outlet of said compressor and an outlet coupled to a second location upstream of an inlet of said compressor, said compressor recirculation passage including a valve positioned inside the compressor recirculation passage;
a mass air flow sensor positioned downstream of the compressor recirculation passage outlet and upstream of the compressor recirculation passage inlet; and
a controller with computer readable instructions stored in non-transitory memory configured to:
estimate a total engine flow entering engine cylinders based on a manifold pressure and an engine speed (speed density);
measure a total intake flow via the mass air flow sensor;
estimate a recirculation flow based on a difference between the total engine flow and the total intake flow;
determine a total amount of sludge accumulation on the valve based on the estimated recirculation flow;
operate the valve based on the total amount of sludge accumulation; and
generate a diagnostic signal indicative of the total amount of sludge accumulation.

19. The system of claim 18, wherein the controller is further configured to determine a total position correction based on a difference between the estimated recirculation flow and a desired recirculation flow.

20. The system of claim 19, wherein the controller is further configured to update a calibration table for operating the valve based on the total position correction.

\* \* \* \* \*